W. S. BARKER.
GRAIN CONDITIONING AND TEMPERING MACHINE.
APPLICATION FILED MAR. 19, 1915.

1,169,599.

Patented Jan. 25, 1916.
2 SHEETS—SHEET 2.

WITNESSES

INVENTOR
William S. Barker
BY
ATTORNEYS

UNITED STATES PATENT OFFICE.

WILLIAM SANDERS BARKER, OF AUBURN, KENTUCKY.

GRAIN CONDITIONING AND TEMPERING MACHINE.

1,169,599. Specification of Letters Patent. Patented Jan. 25, 1916.

Application filed March 19, 1915. Serial No. 15,426.

*To all whom it may concern:*

Be it known that I, WILLIAM S. BARKER, a citizen of the United States, and a resident of Auburn, in the county of Logan and State of Kentucky, have invented a new and Improved Grain Conditioning and Tempering Machine, of which the following is a full, clear, and exact description.

This invention relates to improvements in means for treating grain previous to milling and has for an object to provide an improved structure through which grain may pass for conditioning and tempering to any desired extent.

Another object in view is to provide a machine which will automatically adjust itself to different volumes or amounts of grain so that the grain passing through, whether large or small in amount, will be equally tempered.

A still further object of the invention is to provide a mechanism which will separate the grain in such a manner that the individual grains pass through a tempering zone of mist or water in a finely divided state, whereby each grain is acted upon.

Figure 1:
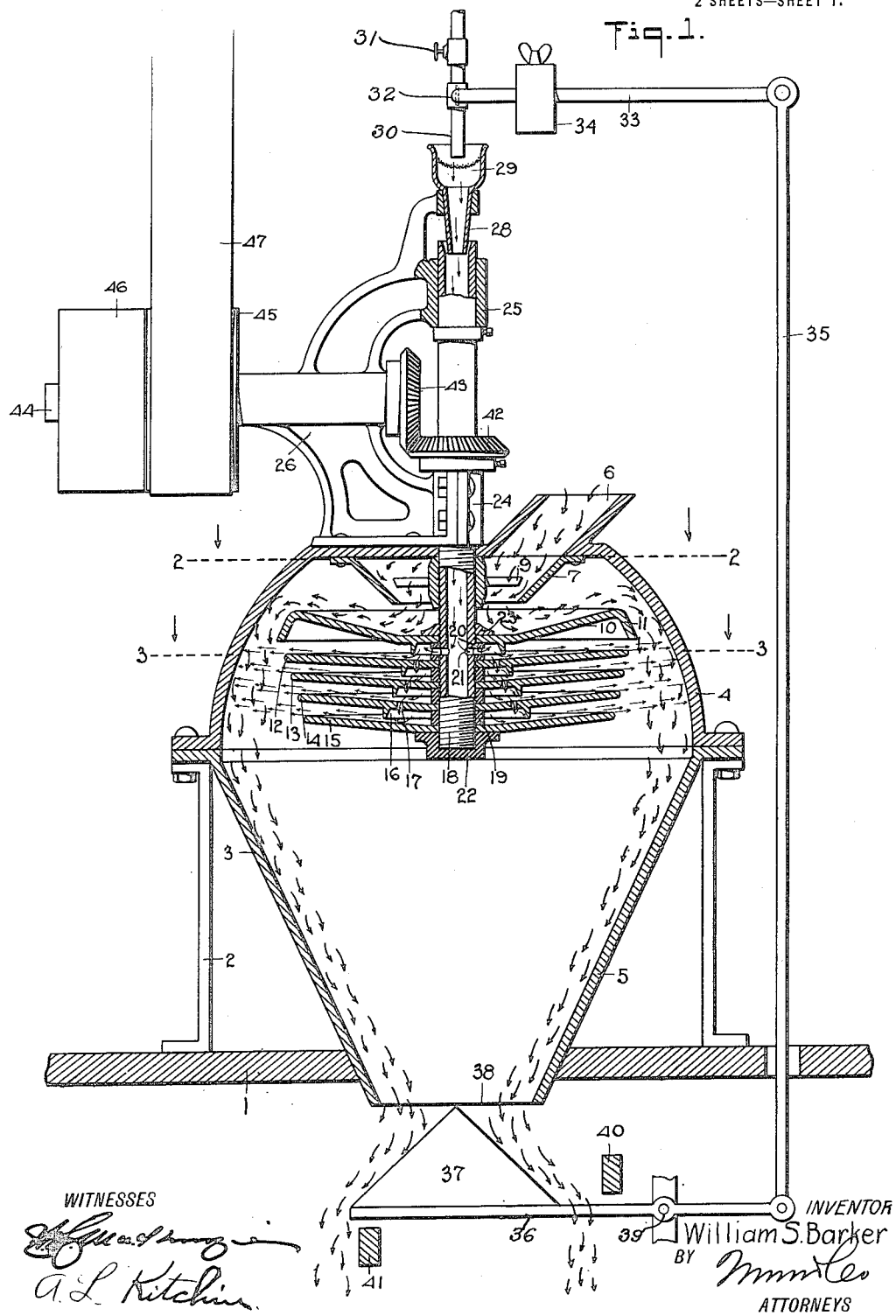
Figure 2:
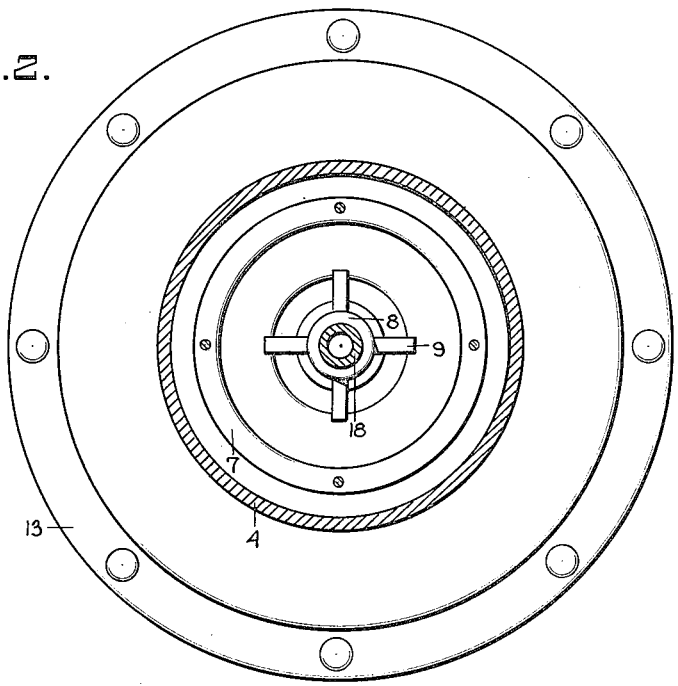
Figure 3:
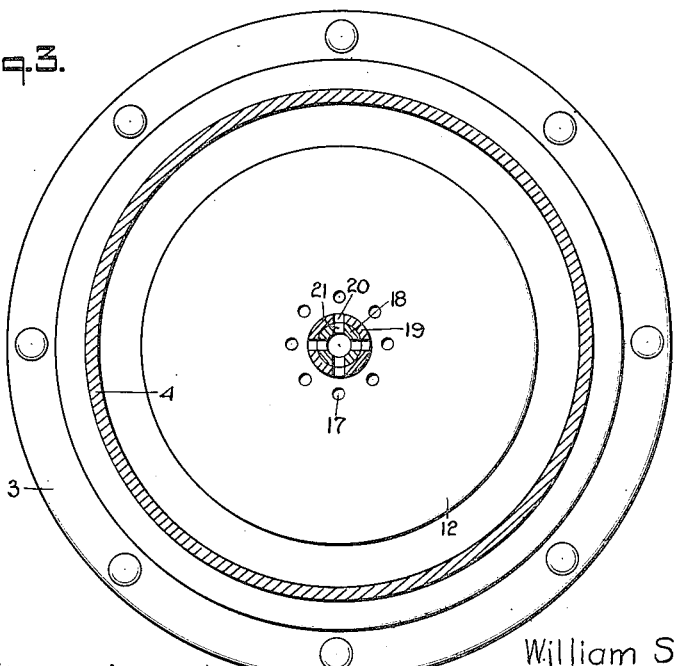

In the accompanying drawings:—Figure 1 is a longitudinal vertical section through a machine embodying the invention; Fig. 2 is a section through Fig. 1 on the line 2—2; Fig. 3 is a section through Fig. 1 on the line 3—3.

Referring to the accompanying drawings by numeral, 1 indicates a support of any desired kind on which are mounted uprights 2, said uprights being connected with a casing 3 by any suitable means, as for instance, bolts. The casing 3 is preferably made in two parts so that there will be an upper dome-shaped section 4 and a lower conical section 5. The dome-shaped section 4 is closed at the upper end except for an opening 6 which acts as an inlet opening for the grain, said opening directing the grain to a frusto-conical-shaped guide 7 in which a stirring member 8 is positioned, said stirring member being supplied with a number of arms 9 for stirring the grain as the same enters. The grain after passing the arms 9 falls into the upper part of dome 4 and strikes a plate 10 dished somewhat, said plate being provided with a depending flange 11.

Below the plate 10 are a plurality of water distributing plates 12, 13, 14 and 15. There are four water distributing plates shown but it will be evident that a greater or less number could be provided without departing from the spirit of the invention. Each of these plates except the lowermost is provided with an annular depending flange 16 arranged exteriorly of the aperture 17 formed in the plate above. The plate 10 is provided with an annular flange 16 similar to the remaining plates, said flanges extending to near the upper surface of the next plate beneath. All of these plates are secured to a rotating hollow shaft 18 so as to rotate therewith. The securing means may be of any kind, as for instance, threads, and the plates are spaced apart by sleeves 19 removably threaded on to the shaft 18. The uppermost sleeve 19 is provided with a plurality of apertures 20 registering with apertures 21 in the tubular shaft 18. A cap 22 is connected to the lower end of shaft 18 and a nut 23 is arranged above plate 10 so as to clamp plate 10, and also the remaining plates, firmly in position against movement.

Shaft 18 extends upwardly and through suitable bearings 24 and 25 in bracket 26 and has the upper end open so as to receive a funnel-shaped member 28. Member 28 is provided with a strainer 29. A water supply pipe 30 extends to a point adjacent cup 29 and supplies water to the funnel 28 whenever the valves 31 and 32 are opened. Valve 31 is manually controlled while valve 32 is automatically controlled and is preferably arranged as a butterfly valve although some other form of valve may be utilized without departing from the spirit of the invention. Connected with valve 32 is an arm 33 which has mounted thereon an adjustable weight 34 tending to move the arm in a predetermined direction. Pivotally connected to arm 33 is a connecting rod 35 which in turn is pivotally connected with arm 36 which is secured to a conical-shaped deflecting member 37 arranged immediately beneath the section 5. Section 5 is provided with an opening 38 for allowing the discharge of grain from casing 3, said discharge being directly on the conical-shaped member 37. Arm 36 is pivotally mounted at 39 so that when a predetermined weight has been brought to bear on the conical-shaped member 37 arm 39 will move so as to raise rod 35 and thereby open valve 32 in proportion to the movement of arm 36. When arm 36 is engaged with stop 40 valve 32 is closed and when engaged with stop 41 valve 32 is opened to its fullest extent. Preferably there is a sufficient quantity of grain fed into the machine for moving the lever to point adjacent the stop 41, which will allow a maximum output for the machine while insuring a proper supply of water for tempering and conditioning the grain. If for any reason the supply of grain should cease or almost cease the weight of the grain striking the conical-shaped member 37 will be reduced to such an extent as to allow the valve 32 to close, the same moving by reason of the weight 34, said weight overbalancing the cone 37 and associated parts when there is no grain resting on the cone.

A beveled gear 42 is connected with shaft 18 and is continuously in mesh with a driving gear 43 which is secured to shaft 44 carrying pulleys 45 and 46, pulley 46 being rigidly secured to shaft 44 so that when the belt 47 is operated and is arranged on pulley 45, power will be transmitted to shaft 18 for rotating the same. The speed of rotation of the shaft 18 and the various disks or plates connected therewith may be varied and there may be any desired number of revolutions per minute. Three hundred and fifty revolutions or rotations have been found desirable in medium sized machines. The rotation of the plate 10 distributes the grain evenly over the periphery of the plate, said grain, of course, striking the sides of section 4 and then passing downwardly under the action of gravity to the discharge opening 38. As the grain passes the plates 12 to 15, inclusive, a fine spray or mist is projected into the path of movement of the grain. This zone of evenly divided water or mist is arranged so that each grain may be evenly acted upon and thus condition or temper evenly all of the grain passing through the machine and so prepare the same for better milling.

The water passing from pipe 30 enters the funnel 28 and from thence enters the hollow shaft 18 from which it escapes through apertures 20 and 21. Some of this water passes radially outwardly and is discharged upon the periphery of plate 12 while the remaining water passes through the various apertures 17 in plate 12. This action is repeated on plates 13 and 14, respectively. All of the water passing from plate 14 to plate 15 will move radially off plate 15 as this plate has no aperture. As these plates are rotated very rapidly the water moving to the periphery of the plates will naturally be a very thin sheet and will become a mist when discharged from the plates so that there will be provided a moisture zone through which the separated grain must pass. By providing the cone 37 and associated parts automatic means are presented which will control and vary the amount of water added in proportion to the quantity of grain passing through the machine and thereby cause the grain to be properly tempered whether there is a large amount or small amount passing through the machine.

What I claim is:—

1. In a machine of the character described, a housing, means for directing grain into said housing, means for distributing said grain in a loose state, a water supplying member, and a plurality of movable plates for dividing the water supplied by the water supply member into a finely divided state or mist, said water in the finely divided state being forced by said plates into the path of movement of said loose grain so that the grain may absorb a certain proportion of water.

2. In a machine of the character described, a casing, means for directing grain into said casing, a rotating shaft extending into said casing, a stirring member connected with said shaft and arranged in the path of movement of the grain for stirring and loosening the grain as the same pass into the machine, a deflecting member for deflecting and spreading the grain so that the same will move under gravity adjacent the sides of the casing, and means for forcing a spray or mist into the path of movement of the grain whereby the grain is subjected to moisture while the grain is in a loose state.

3. In a machine of the character described, a casing, a rotating power member extending into said casing, said casing being provided with a grain inlet, a stirring member operated from said power member for stirring the grain as the same enters the casing, a distributing member adapted to receive the grain from said stirring member and projecting the grain to a point adjacent the periphery of the casing, a plurality of disks connected with said power member and rotated thereby, and means for supplying water to each of the disks whereby the water is forced radially and discharged into the path of movement of the grain as the grain leaves said distributing member.

4. In a machine of the character described, a casing substantially circular in cross section, said casing being formed with an inlet opening, a stirring member arranged adjacent said opening, a distributing member adapted to receive the grain from said stirring member and directing the same to the periphery of the casing whereby the grain is distributed so that the same will fall in a loose state under the action of gravity, a rotating plate arranged below the distributing member, and means for supplying water to said rotating plate, whereby the water will be distributed by centrifugal action to the grain while passing through the air adjacent said plate.

5. In a machine of the character described, a casing substantially circular in cross section, a rotating shaft extending into said casing, a stirring member arranged in said casing and operated by said shaft, said casing being provided with an opening which guides grain entering the casing to said stirring member, a disk operated by said shaft designed to receive the grain from said stirring member and project the same against the upper side walls of the casing, after which the grain is allowed to fall under the action of gravity to the lower part of the casing, said lower part of the casing being provided with an outlet opening, a plurality of rotating disks operated by said shaft, and means for supplying all of said disks with water whereby the water is forced into the path of movement of the grain.

6. In a machine of the character described, a casing provided with an inlet opening adjacent the top and an outlet opening adjacent the bottom, a deflecting member arranged in the casing for receiving and discharging the grain entering the opening centrally of the casing, an agitating member arranged to operate within the deflecting member, a rotating distributing member arranged below the deflecting member for distributing the grain to the outer part of the casing after which the grain is allowed to fall under the action of gravity to the discharge opening, a plurality of water distributing plates arranged below said distributing member, a power shaft for rotating said water distributing plates, said distributing member and said agitating member, and means for supplying water to said plates, the rotation of said plates causing the water supplied thereto to be projected into the path of movement of the grain while the same is falling from the distributing member at the outlet opening.

7. In a machine of the character described, a casing substantially circular in cross section, said casing having an inlet opening near the top and an outlet opening near the bottom, a power shaft extending into said casing and arranged substantially centrally thereof, said power shaft being hollow, means for supplying water to said power shaft, a plurality of water distributing plates connected to said power shaft and arranged to receive water therefrom, whereby whenever said power shaft is rotated said plates will be rotated and water will be distributed upon the periphery of the plates, a grain distributing member arranged above said plates and adapted to direct the grain to a point above the plates, whereby the grain must fall through the moisture zone created at the periphery of the plates, and a stirring member arranged adjacent the inlet of the casing for stirring the grain immediately previous to being operated upon by said distributing plates.

8. In a machine of the character described, a casing formed substantially circular in cross section, said casing having an inlet opening adjacent the top and an outlet opening at the bottom, a vertically arranged hollow power shaft arranged substantially centrally of the casing, a plurality of plates secured to said shaft and extending in a horizontal plane, said shaft having a plurality of openings above said plates, certain of said plates having openings whereby water may pass from one plate to the other, means for directing part of the water on each of said plates to said openings, means for supplying water to said hollow shaft, and means for guiding grain so that the same will fall past the periphery of said plates while the plates are in rotation, the rotation of said plates by said shaft causing the water on the plates to be distributed in the form of a mist at the periphery of the plates.

9. In a machine of the character described, a casing, a plurality of rotating water distributing plates arranged in the casing, a grain distributing plate arranged in the casing and adapted to cause the grain to pass the periphery of said water distributing plates in a sheet or stream, means for supplying said plates with water, a valve for controlling said supply means, a pivotally mounted member arranged opposite the discharge opening of the casing and acted on by the grain passing out of said discharge opening, and connecting mechanism connecting said last mentioned means with said valve so that the position of the valve will be varied according to the weight of grain on said last mentioned means.

10. In a machine of the character described, a casing provided with an inlet opening and an outlet opening, a plurality of rotating water distributing disks adapted to provide a mist or moisture zone adjacent the periphery of the disks, a grain distributing member arranged above said disks and adapted to distribute the grain so that the same will fall in a sheet under the action of gravity through said mist or moisture zone, means for supplying said disks with water, a valve for automatically varying the amount of water supplied to said disks, a conical-shaped damper arranged below the discharge opening of the casing, whereby the grain from the casing will strike the same, means for connecting said conical-shaped damper with said valve, whereby when there is a large stream of grain striking the damper the same will cause the valve to be opened to a large extent and when the amount of grain striking the damper is small will cause the valve to be closed to a corresponding extent, and means acting on the valve and on said conical-shaped member for giving the conical-shaped member a continuous tendency to close said valve.

11. In a machine of the character described, means for receiving grain and distributing the same in a sheet or stream, a plurality of water distributing members arranged adjacent said means and adapted to project a spray or mist of water into said stream of grain, means for supplying water to said water distributing means, a valve for controlling the water, means for continually tending to hold said valve closed, and a member operated on said stream of grain after the same has passed the water distributing members for opening said valve, said means acting on said valve in proportion to the weight of the grain in said stream.

In testimony whereof I have signed my name to this specification in the presence of two subscribing witnesses.

WILLIAM SANDERS BARKER.

Witnesses:
J. GUTHRIE COKE,
H. B. McCLARY.